(12) United States Patent
Mewes et al.

(10) Patent No.: US 11,498,149 B2
(45) Date of Patent: Nov. 15, 2022

(54) ELECTRODE UNIT FOR INERT GAS WELDING WITH NON-CONSUMABLE ELECTRODE

(71) Applicant: Dinse G.m.b.H., Hamburg (DE)

(72) Inventors: Christopher Mewes, Kaltenkirchen (DE); Michael Jürgens, Hamburg (DE)

(73) Assignee: DINSE G.M.B.H.

( * ) Notice: Subject to any disclaimer, the term of this patent is extended or adjusted under 35 U.S.C. 154(b) by 413 days.

(21) Appl. No.: 16/704,060

(22) Filed: Dec. 5, 2019

(65) Prior Publication Data

US 2020/0180064 A1 Jun. 11, 2020

(30) Foreign Application Priority Data

Dec. 5, 2018 (EP) ..................................... 18210312

(51) Int. Cl.
| | |
|---|---|
| *B23K 9/29* | (2006.01) |
| *B23K 9/167* | (2006.01) |
| *B23K 9/28* | (2006.01) |
| *B23K 35/22* | (2006.01) |
| *B23K 37/00* | (2006.01) |

(52) U.S. Cl.
CPC .............. *B23K 9/296* (2013.01); *B23K 9/167* (2013.01); *B23K 9/287* (2013.01); *B23K 35/222* (2013.01); *B23K 37/003* (2013.01)

(58) Field of Classification Search
CPC ........ B23K 9/296; B23K 9/167; B23K 9/287; B23K 35/222; B23K 37/003
See application file for complete search history.

(56) References Cited

U.S. PATENT DOCUMENTS

| | | | | |
|---|---|---|---|---|
| 2,514,060 A | * | 7/1950 | Himmelman | .......... B23K 9/296 219/75 |
| 5,892,199 A | * | 4/1999 | Ahmed | .................. B23K 9/167 219/137 R |

FOREIGN PATENT DOCUMENTS

| | | |
|---|---|---|
| DE | 102009008250 | 8/2010 |
| DE | 102009008250 | 3/2011 |
| EP | 0151100 | 8/1985 |
| EP | 1291112 | 3/2003 |

OTHER PUBLICATIONS

Translation of Schuster et al. EP 2213402 performed on Mar. 22, 2022 (Year: 2010).*

* cited by examiner

*Primary Examiner* — Brian W Jennison
(74) *Attorney, Agent, or Firm* — Sand, Sebolt & Wernow Co., LPA (57) ABSTRACT

An electrode unit for inert gas welding by means of a non-consumable. The electrode unit includes an electrode holder and an electrode held firmly and undetachably in the electrode holder and having an electrode tip at a front end. The electrode protrudes beyond the electrode holder by means of the electrode tip on a first longitudinal end of the electrode holder. A gas guide channel is formed in the electrode holder, with an inlet opening located toward a second longitudinal end of the electrode holder. At least one outlet opening is oriented transversely with respect to a longitudinal extent of the electrode holder and located offset from the inlet opening, when viewed in the direction of the longitudinal extent, toward the first longitudinal end. The electrode unit is able to be efficiently cooled during the welding operation and has a reduced tendency to jam or wedge due to thermal expansions.

24 Claims, 2 Drawing Sheets

ELECTRODE UNIT FOR INERT GAS WELDING WITH NON-CONSUMABLE ELECTRODE

TECHNICAL FIELD

The invention relates to an electrode unit for inert gas welding with a non-consumable electrode with an electrode holder and with an electrode which is held firmly and undetachably in the electrode holder, which comprises an electrode tip at the front end and which protrudes beyond the electrode holder by means of the front end comprising the electrode tip on a first longitudinal end of the electrode holder.

BACKGROUND

Background Information

Inert gas welding with a non-consumable electrode arranged in a welding torch is a welding method that has been known and used for a long time. Here, with the non-consumable electrode which, opposite the electrically contacted work piece to be welded, is energized with electrical voltage and is correspondingly contacted, an electric arc is generated, which reaches the work piece and introduces thermal energy there, in order to melt the material of the work piece and thus generate the welding seam. In order to prevent the welding seam from being affected by penetrating atmospheric oxygen or other reactive gases, the non-consumable electrode is washed around by an inert gas stream which surrounds the welding site and closes it off with respect to the outside atmosphere. Today, as non-consumable electrodes, tungsten electrodes or electrodes made of a tungsten alloy are typically used. The corresponding method is then referred to as tungsten inert gas welding (TIG).

Although in such a method the non-consumable electrode, in particular the tungsten electrode, is in principle not consumed in the welding process, it is nevertheless exposed to high stresses and loses its shape over time, and is worn off. For an exact generation of the electrical arc, the metal electrode has a sharpened front end. When the electrode tip becomes blunt due to wear, the welding result worsens, the electrode has to be replaced or reprocessed. In known systems, such as, for example, in a design shown in U.S. Pat. No. 5,892,199, a longitudinally extended electrode needle is detachably arranged in an electrode holder. The electrode needle typically consists of tungsten or a tungsten alloy. When the electrode tip is then worn, the electrode needle can be removed from the electrode holder and replaced by a fresh electrode with a sharp tip. Here, the worn electrode needle can be and indeed is processed, for example, by grinding, in order to bring the electrode tip which has become blunt due to wear again into an electrode form that converges sufficiently to a point and thus to sharpen the electrode as it were. A thus reprocessed electrode needle which has been provided again with a sharp tip can then again be inserted in the electrode holder and fastened therein.

In the process, a problem arises, in that, after the replacement of the electrode needle, the positions of the electrode tip with respect to the other arrangement of the welding torch cannot be reproduced exactly, so that, in particular during robot welding, the position of the electrode tip in space has to be reestablished exactly before a continuation of the welding process, using, for example, a setting gauge or a comparable adjustment instrument, or the position of the electrode tip in space may possibly even have to be learned anew.

In order to solve this problem and in order to enable, during the exchange of a worn electrode tip or worn non-consumable electrode, an immediate continuation of the welding process without required readjustment of the newly inserted electrode tip or even relearning by the robot, it has been proposed in the prior art to form an electrode unit which contains, accommodated firmly and undetachably in an electrode holder, a non-consumable electrode, typically in the form of a needle, and which can be inserted and fastened in a corresponding accommodation of the welding torch in a defined and reproducible manner, for example, by screwing. Such a solution is described, for example, in DE 10 2009 008 250 B4, which shows an electrode unit. In this solution, the electrode unit is a consumable or wearing part in which, after the wearing off of the electrode tip, no resharpening occurs, but instead the entire electrode unit is disposed of or recycled in the context of the recycling (metal recycling). Since the electrode unit, in particular the electrode holder, as already mentioned, can be fastened reproducibly in an accommodation on the welding torch, a worn electrode unit, that is to say an electrode unit with worn off electrode tip of the non-consumable electrode, can be removed from the accommodation on the welding torch, a fresh electrode unit can be inserted and, without adjustment of the position of the electrode tip or even a relearning of the contact point (that is to say of the position of the electrode tip in space), the welding process can also be immediately continued even in robot welding. This results in a clear reduction of the time and thus in an increase of the usable operating time of the robot welding apparatus or of the robot welding system, so that the exploitation of the machine can be increased and thus costs can be saved.

However, it has been found that problems that need addressing occur in this previously known electrode unit. Typically, welding torches in which an electrode unit as known is incorporated are water cooled in order to dissipate the thermal energy, the heat produced, generated during the welding process. However, due to construction-related circumstances, a water cooling led in a closed circuit cannot be led up to an area in which the electrode unit sits in the accommodation.

Correspondingly, in a constructive solution according to DE 10 2009 008 250 B4, it is provided to guide cooling water in a central cooling pipe into a hollow space formed between the screwed in electrode unit, more precisely its rearward front surface and the outlet of the cooling pipe. However, this constructive solution entails different disadvantages. On the one hand, the design of the cooling water guiding provided there is problematic, to the extent that, in the hollow space, the cooling water exiting the cooling pipe has to flow both in the direction of the electrode unit and also away from said electrode unit in order to be evacuated. Thus, a dead end is formed here in a manner of speaking, which, as is known, leads to problems in the guiding of the cooling agent; in particular it decreases the efficiency of the cooling at the end of the dead end. Moreover, here one must ensure a sealing of the hollow space through the electrode unit which is firmly fastened, in particular screwed in, there. To that extent, not only at the time of a replacement of the electrode unit, a cooling medium, in particular water, can exit and thus reach areas of the work piece processing where such a medium is not desired. In addition, in the case in which the electrode unit has not been inserted quite correctly, there is the potential risk during the welding process that cooling medium, that is to say water, exits there. An exit of water during the welding process, due to the rapid evaporation and the associated exclusive action, is associated with a high hazard level; in addition, there is a risk of electrical short circuits, when electrical energy is applied to cooling water which is naturally current conducting. In an additional design, DE 10 2009 008 250 B4 provides that the hollow space does not protrude as far as the rearward front end of the electrode unit, but rather is led only into an accommodation for the electrode unit and ends there as a dead end. Even if the above-described sealing problems and the risk of an exit of the cooling medium do not exist, the problems of the low cooling action of a cooling medium led in a dead end still remain. In addition, the active site of the cooling medium is farther away from the electrode unit, so that the resulting cooling action is lower.

An additional problem in the case of the solution known from DE 10 2009 008 250 B4 consists in that the electrode unit inserted, typically screwed, into the accommodation abuts by means of a peripheral abutment surface against a front-side abutment of an electrode accommodation of the welding torch, when said electrode unit is inserted and firmly screwed in. In the case of high thermal stresses to which the electrode holder and also the electrode accommodation of the welding torch of the welding process are exposed, thermal deformations can occur, which lead to a jamming of the electrode holder, that is to say of the electrode unit, in the electrode accommodation of the welding torch, so that the connection between the electrode holder and electrode accommodation can no longer be released, and thus an electrode unit with worn electrode can no longer be disassembled and exchanged. In such a case, additional components of the welding torch then have to be exchanged, which usually have longer useful lives than the electrode unit. This not only increases the costs but also, contrary to the benefit at first achieved, leads to an increase of the setup times and down times of the welding torch or of the welding robot equipped therewith, thus entailing considerable economic disadvantages.

SUMMARY

The aim of the invention is to remedy these recognized disadvantages. Thus, by means of the invention, an electrode unit according to the preamble, as described above, should be improved in that it can be cooled efficiently during the welding operation and has a decreased tendency to jam or wedge due to thermal expansions.

According to the invention, this aim is achieved by an electrode unit for inert gas welding by means of a non-consumable electrode with an electrode holder and with an electrode which is held firmly and undetachably in the electrode holder, which comprises an electrode tip) at the front end and which protrudes beyond the electrode holder by means of the front end comprising the electrode tip on a first longitudinal end of the electrode holder wherein in the electrode holder, a gas guide channel is formed, with an inlet opening which is located toward a second longitudinal end opposite the first longitudinal end of the electrode holder, and with at least one outlet opening which is oriented transversely with respect to a longitudinal extent of the electrode holder and located offset from the inlet opening, when viewed in direction of the longitudinal extent, toward the first longitudinal end. Advantageous developments of such an electrode unit include that the electrode unit may feature a plurality of outlet openings arranged distributed along a periphery of the electrode holder and oriented transversely with respect to the longitudinal extent. The inlet opening may advantageously be arranged on a front side of the electrode holder, which is formed on the second longitudinal end, and the gas guide channel may comprise a longitudinal section) which extends along the longitudinal extent starting from the inlet opening and which is led in the direction of the first longitudinal end, and at least one transverse channel section may be provided which is led transversely with respect to the longitudinal channel section and opens in the outlet opening. The longitudinal channel section may extend along a central longitudinal axis of the electrode holder. The electrode may end with a rear end firmly anchored in the electrode holder, in a longitudinal position of the electrode holder, which, when viewed in the direction of the second longitudinal end of the electrode holder, lies in front of the position/the positions of the outlet opening/openings. The electrode holder of the electrode unit may further comprise a shaft section and an operative section adjoining the shaft section in the direction of the first longitudinal end, wherein, in the area in which the operative section adjoins the shaft section, the operative section has an increased diameter in comparison to the shaft section. The outlet opening(s) of the electrode unit may further be formed in the shaft section. The shaft section may comprise a linking structure for the detachable fastening of the electrode unit on a connection structure provided in a welding torch and a tool engagement may be formed in the operative section for the setting of a tool for fastening the electrode unit on the connection structure. In the electrode unit, in the operative section, a peripheral side outer surface of the electrode holder with a diameter which tapers in the direction of the first longitudinal end may be formed as gas guide surface.

In the area of its second longitudinal end, the electrode holder may further comprise a seating cone which tapers toward the second longitudinal end. The inlet opening may be arranged in the area of the seating cone and the outlet opening(s) may be arranged outside of the seating cone. The electrode particularly may be fastened in a firmly bonded manner and/or pressed in the electrode holder. The electrode holder may be comprised of a metal with high thermal conductivity, in particular of copper. In other embodiments, the electrode is comprised of tungsten or a tungsten alloy.

An additional aspect of achieving this aim consists according to the invention of a welding torch for inert gas welding with a non-consumable electrode as described above.

According to the invention, an electrode unit for inert gas welding by means of a non-consumable electrode thus comprises an electrode holder and an electrode firmly and undetachably held in the electrode holder. The electrode has at a front end an electrode tip, wherein the front end of the electrode comprising the electrode tip protrudes beyond the electrode holder at a first longitudinal end of the electrode holder. To that extent, the electrode unit according to the invention is of the same construction as the previously disclosed electrode unit, for example, according to DE 10 2009 008 250 B4. The special characteristic of the electrode unit according to the invention then consists in that a gas guide channel is formed in the electrode holder. This gas guide channel comprises an inlet opening located toward a second end of the electrode holder opposite the first longitudinal end of the electrode holder. The inlet opening is connected by the gas guide channel to at least one outlet opening oriented transversely with respect to a longitudinal extent of the electrode holder and located offset from the inlet opening, when viewed in the direction of a longitudinal extent, toward the first longitudinal end.

By this design, gas can be led through the electrode unit, more precisely through the electrode holder. For this purpose, in particular the electrode holder, that is to say the electrode unit, which is arranged and fastened in a corresponding electrode accommodation of the welding torch, is connected during operation to a gas channel from which gas supplied in the welding torch is transferred into the inlet opening. This gas can, in particular, be an inert gas which is used, in a manner as described above, during the welding process for closing off the welding site with respect to the surrounding atmosphere and thus for preventing penetration of oxidizing or otherwise reactive gas into the welding site. On the one hand, the gas guide channel in the electrode holder here performs the task of supplying gas, in particular inert gas, to the welding site. On the other hand, the passage of the gas through the electrode holder leads to an additional cooling effect. Heat generated during the welding process and transferred via the electrode to the electrode holder can thus at least in part be absorbed by the gas, in particular inert gas, flowing through and thereby be dissipated from the component. An additional cooling can be and generally is achieved in particular by liquid cooling, in particular water cooling, by means of which, for example, the area of the electrode accommodation in the welding torch is further cooled, so that heat accumulating in the electrode unit is dissipated via the electrode holder to the electrode accommodation and from there to the liquid cooling agent.

The circumstance that the outlet opening is oriented transversely to the longitudinal extent of the electrode holder helps in the distribution of the exiting gas flow in peripheral direction in order thus to distribute the gas, in particular inert gas, as evenly as possible around the electrode tip of the electrode, that is to say around the welding site, and thus to shield the welding site as well as possible.

This additional cooling possibility provided by the gas guide channel results in an improved cooling of the component of the electrode unit, which leads to a clear reduction of the risk of wedging or jamming of this component in an accommodation in an electrode holder of a welding torch. In addition, this improved cooling brings about a lengthening of the useful life of the electrode unit. Since in direct contact with the electrode unit, more precisely with the electrode holder, no liquid cooling medium is used, but instead the gas, in particular inert gas, led during the operation in any case to the welding site is used, there is also no problem with, for example, transition sites to be sealed off and with the risk of leaks of liquid cooling medium, as observed in the prior art.

Advantageously, it can be provided that not only one outlet opening but multiple outlet openings are provided, which are arranged distributed along a periphery of the electrode holder and in each case are oriented transversely with respect to the longitudinal extent of the electrode holder. In particular, these outlet openings can be arranged distributed in an identical longitudinal position of the electrode holder along the periphery. This arrangement of multiple outlet openings which are provided distributed along the periphery promotes the peripheral distribution of the gas exiting there and thus ensures furthermore that, at the welding site, there is a curtain of gas, in particular inert gas, enclosing the electrode tip.

Moreover, according to the invention, it can be provided that the inlet opening is arranged on a front side of the electrode holder, which is formed on a second longitudinal end, and that the gas guide channel comprises a longitudinal channel which extends along the longitudinal extent, led, starting from the inlet opening, in the direction of the first longitudinal end, and also at least one transverse channel section which is led transversely with respect to the longitudinal channel section and which opens in the outlet opening. This transverse channel section, in the case of multiple outlet openings the transverse channel sections, connect/connects the outlet opening(s) here to the longitudinal channel section. This design can be produced particularly easily in that the longitudinal channel section is introduced as a dead end bore into the electrode holder, and the transverse channel section (the transverse channel sections) is/are implemented by (a) transverse bore(s) which lead(s) into the longitudinal bore. In addition, by this design, the material of the electrode holder is run through over the longest possible distance by the gas flowing through the gas guide channel, resulting in a long distance for the absorption of heat to be dissipated, and the cooling effect is improved. In particular, according to an additional advantageous development of the invention, the longitudinal channel section extends along a central longitudinal axis of the electrode holder. On the one hand, a longitudinal channel section led in this manner lies symmetrically in the material of the electrode holder and can thus equally well absorb heat all around from all the sides. On the other hand, a production with a centrally drilled dead end bore in longitudinal direction of the electrode holder is relatively easy to implement.

With an additional advantageous development of the invention, it can be provided that the electrode ends with a rear end firmly anchored in the electrode holder, in a longitudinal position of the electrode holder, which, when viewed in the direction of the second longitudinal end of the electrode holder, lies in front of the position (in front of the positions) of the outlet opening(s). In this design, the longitudinal channel section thus alone remains in the material of the electrode holder, but it can advantageously be brought as close as possible to the electrode. However, it is also possible to lead the longitudinal channel section sufficiently far so that it reaches rearward the front end of the electrode, designed in particular in the form of a pin, which is located there. The farther the longitudinal channel section is led in the direction of the front end of the electrode holder, the better the gas flowing through the longitudinal channel section can absorb and dissipate the heat produced there.

In an additional embodiment variant, it can advantageously be provided that the electrode holder comprises a shaft section and an operative section adjoining the shaft section in the direction of the first longitudinal end, wherein, in the region in which the operative section adjoins the shaft section, the operative section has a larger diameter in comparison to the shaft section. The increased diameter can in particular be formed abruptly and with formation of a ledge, in particular of a ledge with a ledge surface extending transversely, in particular perpendicularly, to the longitudinal extent or to a longitudinal axis of the electrode holder. By means of a shaft section, the electrode unit, in particular its electrode holder, can be fastened in an electrode accommodation of the welding torch.

In such a design, the outlet opening(s) can be formed with an electrode holder subdivided into a shaft section and an operative section, in particular in the shaft section, so that gas led through the gas guide channel exits, when viewed from the front end of the electrode holder, behind of the operative section. In a design of the electrode holder as described above, with a subdivision into operative section and shaft section, the shaft section moreover can comprise a linking structure for the detachable fastening of the electrode unit to a connection structure provided in a welding torch, for example, to a connection structure in an electrode holder of the welding torch, and then, in the operative section, a tool engagement can be formed, for setting a tool for fastening the electrode unit on the connection structure. For example, the linking structure can be an outer threading, and the connection structure can be an inner threading in the electrode accommodation or another element of the welding torch. The tool engagement can be, for example, an external hexagon corresponding to such a hexagonal nut. Here, the increased diameter of the operative section helps, since thereby, for example, an external hexagon can be formed with an increased metric or inch tool size, which enables the application of a greater torque with a corresponding tool.

In the operative section of a design of the electrode holder as described above, with operative section and shaft section, as gas guide surface a peripheral outer surface of the electrode holder can moreover be formed with a diameter which tapers in the direction of the first longitudinal end. This gas guide surface can be used to lead gas exiting the outlet opening or the outlet openings, flowing in the direction of the front end of the electrode holder, typically in cooperation with a gas guide casing attached in the assembled state of the welding torch, so that the gas, in particular inert gas, forms the protective gas curtain to be formed at the welding site and securely protects the welding site against penetration of oxidizing or otherwise reactive gas, which otherwise could negatively affect the welding result.

An additional advantageous development of the electrode unit according to the invention provides that the electrode holder can comprise on its second longitudinal end a seating cone tapering conically toward the second longitudinal end. With such a seating cone, the electrode holder and thus the electrode unit, during the insertion into the welding torch, can engage in the electrode accommodation of the welding torch, in a corresponding accommodation cone, that is to say a conical accommodation opening, and be introduced with exact fit therein. Such a conical design of the seating in particular has the advantage that a longitudinal abutment is formed, which is formed not by surfaces led largely perpendicularly to the longitudinal extent and abutting against one another, but by surfaces which, although they extend transversely to the longitudinal direction, do so under a clearly flatter angle (for example, when viewed in another direction a more acute angle) corresponding to the cone angle. In another manner than in the case of the impact or abutment surfaces led largely perpendicularly to the longitudinal extent, in the case of tensions applied by thermal deformation, such conical seating surfaces tend not to apply to the linking structures, for example threadings screwed together, a force in such a manner that they become wedged together. Instead, a seat formed by a cone can be detached more easily even in the case of thermal tensions, since, as a result of the cone surfaces extending at a slant, not only a compressive or tensile force potentially wedging the threadings is applied, but, at the same time, a force pointing in the direction of a release of the screw connection is applied, which eliminates the corresponding wedging and tensions, for example, it promotes or facilitates a release. Moreover, with such a seating cone in a corresponding accommodation surface, that is to say in a conically shaped accommodation, a simple sealing of a gas connection can be achieved. Correspondingly, it can be provided that the inlet opening is arranged in the area of the seating cone. Here, the outlet opening is (the outlet openings are) then arranged outside of the seating cone. The gas guide channel thus penetrates through the area of the electrode holder which has the seating cone and leads further into a portion located to the side thereof, reaching the front end, until it opens into the outlet opening(s) opening transversely with respect to the longitudinal extent. The design of the electrode holder with a seating cone for fastening in an accommodation cone in the electrode accommodation of a welding torch can also be implemented without a design of the electrode accommodation with a gas guide channel as described above. In that case as well, when there is in fact no abutment formed with impact or abutment surfaces that are largely perpendicular to the longitudinal extent of the electrode holder, the longitudinal position of the electrode holder in the electrode accommodation is determined only by the abutment between seating cone and accommodation cone; the above advantages of preventing wedging or jamming are achieved. To that extent, this design variant can also be considered an independent invention and is considered so by the applicant. Instead of a pairing consisting of seating cone and accommodation cone, a pairing consisting of a (partially) spherical seating surface, for example, in the form of a segment of a spherical ring section, and a (partially) spherical accommodation can also achieve the same effect.

As already mentioned above, the electrode is firmly and undetachably fastened in the electrode holder in a manner which is essential to the invention. According to an advantageous design of the invention, this can occur by firmly bonded fastening and/or by pressing in. The two types of fastening of the electrode can be implemented easily, wherein, in particular, pressing in can be achieved simply in terms of production technology, while nonetheless reliably ensuring a firm and detachable seating for the electrode in the electrode holder. In the production of the electrode unit according to the invention, in which it must be ensured that said electrode unit occurs with identical dimensioning so that later in an exchange of an electrode unit with a worn electrode for a new electrode unit with a pointed electrode tip on the electrode, an exactly reproduced position of the electrode tip with respect to the welding torch is obtained, it is possible, for example, to introduce into the electrode holder an exactly dimensioned dead end bore from the front end, into which an exactly dimensioned electrode is inserted. Said electrode can be firmly connected, for example, by a rolling process, to the material of the electrode holder, that is to say pressed. However, it is equally well possible to insert the electrode into a dead end bore in the electrode holder, which has not been produced to a highly precise measurement and fasten it, for example, by a rolling process as mentioned above, and subsequently to form or secondarily sharpen the electrode tip to the correct size with regard to its position relative to the electrode holder.

So that the electrode holder can properly absorb the heat arising on the welding torch and transferred to the electrode and then further dissipate it, for example, to the gas flowing through the gas guide channel, or else to the environment of the parts which are in contact with a liquid cooling, the electrode holder can advantageously consist of a metal with high thermal conductivity. This metal can be copper, for example.

The electrode can consist in particular of tungsten or a tungsten alloy, so that the electrode unit according to the invention can be used for tungsten inert gas welding (TIG).

As already mentioned above, an additional aspect of the invention consists of a welding torch for inert gas welding by means of a non-consumable electrode, which is characterized in that it comprises an electrode unit with properties as described above. This electrode unit can be arranged in particular detachably in an electrode accommodation, wherein the electrode accommodation can contain in particular a conical accommodation opening for the accommodation of the seating cone of the electrode holder, if the electrode holder has such a seating cone. In particular, advantageously, it can be provided that the accommodation in the welding torch is designed so that the inserted electrode unit, if it is subdivided in its electrode holder into a shaft section and an operative section, does not abut with the ledge of the operative section against an abutment or ledge of the accommodation or of the electrode holder, when the electrode holder and thus the electrode unit is inserted and fixed in the accommodation. Thus prevented is the formation of abutment surfaces lying largely perpendicularly to the longitudinal extent of the electrode holder, which, in the assembled state, i.e., in the case of the electrode holder inserted into the accommodation, adjoin one another and which, in the case of the action of thermal energy and resulting thermal deformation, can then tend or lead, in a manner as described above, to the wedging or jamming of the mutually engaging linking structures of the electrode holder and of the accommodation. A welding torch according to the invention can moreover comprise in particular a liquid cooling, for example, a water cooling, which additionally cools a component comprising the accommodation for the electrode holder, so that the electrode holder can still also discharge heat to this component, heat which is then dissipated via the cooling fluid.

BRIEF DESCRIPTION OF THE SEVERAL VIEWS OF THE DRAWINGS

Additional advantages and features of the invention result from the following description of embodiment examples in reference to the appended figures.

The figures show.

DETAILED DESCRIPTION

The figures are not necessarily true to scale and moreover do not show all the construction details of the shown objects according to the invention. Instead, they are technical sketches for explaining the features that are essential to the invention of an embodiment variant according to the invention of an electrode unit as well as of an embodiment according to the invention of a welding torch according to the invention which includes this electrode unit, wherein the essential features are shown and can be seen in the figures.

Figure 1:
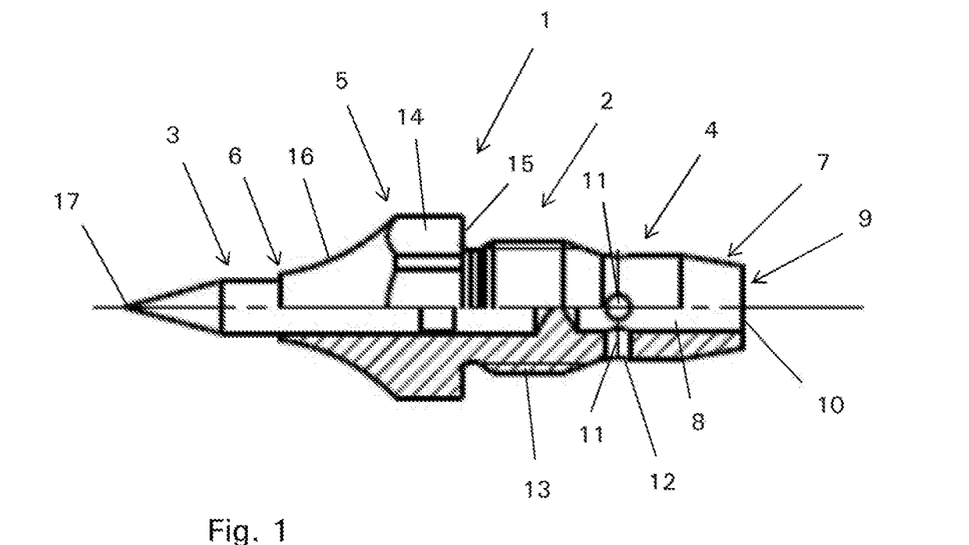
FIG. 1 a view with partial cutaway of a possible embodiment of an electrode unit according to the invention.

In FIG. 1, a possible embodiment of an electrode unit 1 according to the invention is shown first, wherein the representation is a reproduction with partial cutaway. The electrode unit 1 according to the invention first consists of two essential components, namely an electrode holder 2 and an electrode 3 accommodated in the electrode holder 2 and fastened undetachably therein. The electrode holder 2 is formed from a single piece in the embodiment example shown and consists of a thermally conductive metal, in particular of copper. The electrode 3 is an electrode which is non-consumable in the welding process and preferably consists of tungsten or a tungsten alloy. It is used advantageously in TIG welding. The electrode 3 is formed in the form of a rod or pin and it comprises on a front side an electrode tip 17 by means of which it protrudes beyond the front end 6 of the electrode holder 2. The electrode 3 is fastened firmly and undetachably in the electrode holder 2, in particular by pressing in. For this purpose, for example, an axial bore can be introduced into the electrode holder 2, into which the electrode 3 is inserted with a rearward end first and in which the electrode is then fastened by pressing in or rolling.

The electrode holder 2 is subdivided into two different sections, a shaft section 4 and an operative section 5. The shaft section 4 comprises a seating cone 7 at a rear end 9 axially opposite the front end 6. There, the outer contour of the electrode holder 2 is formed such that it tapers conically at a cone angle toward a rearward front surface. In the direction of the front end 6, a cylindrical section adjoins the seating cone 7; then an outer threading 13 is formed in a section of the shaft section 4, which has a widened diameter in comparison to the cylindrical section. With this outer threading 13, the electrode holder 2, and thus the electrode unit 1 as a whole, can be fastened accurately in position in an accommodation of a welding torch in a manner to be described in further detail below.

Starting from the rear end 9, along a longitudinal symmetry axis, a longitudinal bore in the manner of a dead end bore is led into the material of the electrode holder 2, longitudinal bore which forms a longitudinal channel section 8. At the rear end 9, an inlet opening 10 is formed. In the area of the cylindrical section, that is to say starting from the rear end 9, when viewed in the direction of the front end 6 of the electrode holder 2, in front of the outer threading 13, transverse bores are led starting from the radial outer surface distributed over the periphery, which lead into the longitudinal bore, that is to say into the longitudinal channel section 8. These transverse bores form transverse channel sections 11 which lead on the peripheral side into outlet openings 12. In the embodiment example, four such transverse channel sections 11 are formed in a radially even distribution, that is to say offset in each case by 90° with respect to one another. The longitudinal channel section 8 and the transverse channel sections 11 connected thereto as a whole form a gas guide channel which, during operation of a welding torch equipped with the electrode unit 1, is run through by a gas, in particular an inert gas, from the inlet opening 10 to the outlet opening 12.

In an area located toward the rear end 9 of the electrode holder 2, the operative section 5 comprises a tool engagement 14, here an external hexagon corresponding to the hexagon of a screw nut. In the transition between the shaft section 4 and the operative section 5, more precisely the tool engagement 14 of the operative section 5, a ledge 15 is formed, which is oriented transversely, here in particular perpendicularly, to the longitudinal axis of the electrode unit 1 and likewise to the longitudinal axis of the electrode holder 2. Starting from the tool engagement 14, extending further toward the front end 6, the operative section 14 comprises a gas guide surface 16 which tapers in diameter and is formed as curved, and which, during operation of a welding torch equipped with the electrode unit 1, in cooperation with a gas guide casing, is used for the additional guiding of a gas stream led through the gas guide channel formed by longitudinal channel section 8 and transverse channel sections 11.

Figure 2:
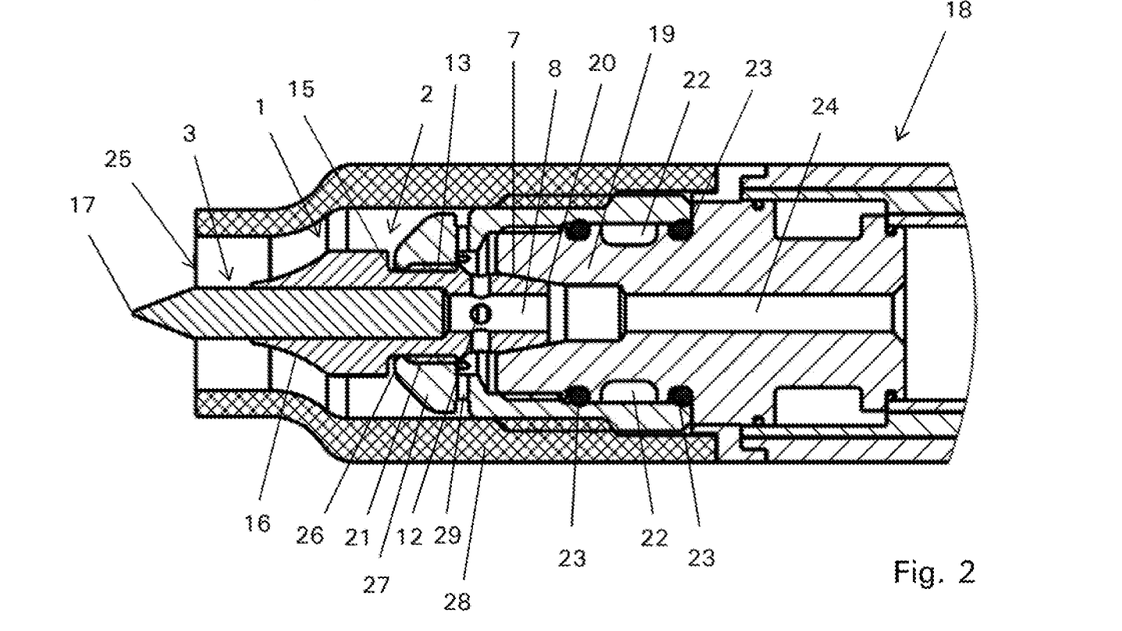
FIG. 2 a longitudinal sectional representation of a section of a welding torch according to the invention equipped with an electrode unit according to the invention as shown in FIG. 1.

In FIG. 2, an electrode unit 1 shown as in FIG. 1 is shown in a position in which it is mounted in a welding torch 18. In the welding torch 18, for this purpose, an electrode accommodation 19 is provided, which in particular is also formed from a metal, preferably from a metal with good thermal conductivity, such as copper, for example. In the electrode accommodation 19, a conical accommodation 20 is formed, which has a cone angle corresponding to the cone angle of the seating cone 7 and is thus used for the accommodation of the seating cone 7. Moreover, one can see an inner threading 21 formed in a gas distributor 27, which cooperates with the outer threading 13 formed on the shaft section 4 of the electrode holder 2 of the electrode unit 1, so that the electrode unit 1 with the outer threading 13 can be screwed in the inner threading 21 and thus fastened. The special feature here is that the electrode unit 1 screwed into the inner threading of the gas distributor 27 undergoes a firm abutment only by the cooperation of the seating cone 7 with the conical accommodation 20, so that, in particular, neither a front surface on the rearward end 9 of the electrode holder 2 nor the ledge 15 at the transition between shaft section 4 and operative section 5 of the electrode holder 2 abuts against corresponding counter-pieces of the electrode accommodation 19 and of the gas distributor 27, there in particular of the front surface 26. Instead, in the mounted state of the electrode unit 1, gaps are left there in each case.

This special feature has the effect that even when there is a high thermal stress on the electrode unit 1 and the additional elements such as gas distributor 27 and electrode accommodation 19, possibly resulting thermal deformations do not lead to jamming forces being exerted here, which lead to wedging or jamming and have the effect that the electrode unit 1 can no longer be detached from the electrode accommodation 19 or from the inner threading 21 in the gas distributor 27. The conically formed abutment between seating cone 7 and conical accommodation 20, even in the case of higher thermal stress, does not apply such jamming forces which wedge the connection of the screw threadings 13 and 21.

Moreover, in FIG. 2, one can also see a gas channel 24 which is led centrally and along a longitudinal axis through the electrode accommodation 19 and which, when the electrode unit 1 is inserted into the electrode accommodation 19 and screwed into the gas distributor 27, forms a connection to the inlet opening 10 of the longitudinal channel section 8 and thus the gas guide channel in the electrode holder 2. As a result of the cooperation between seating cone 7 and conical accommodation 20, a sufficient gas tightness is created, which prevents gas supplied via the gas channel 24 from flowing past the seating cone 7, ensuring that all the gas supplied via the gas channel 24 passes through the inlet opening 10 into the longitudinal channel section 8 and thus into the gas guide channel of the electrode holder 2.

Figure 3:
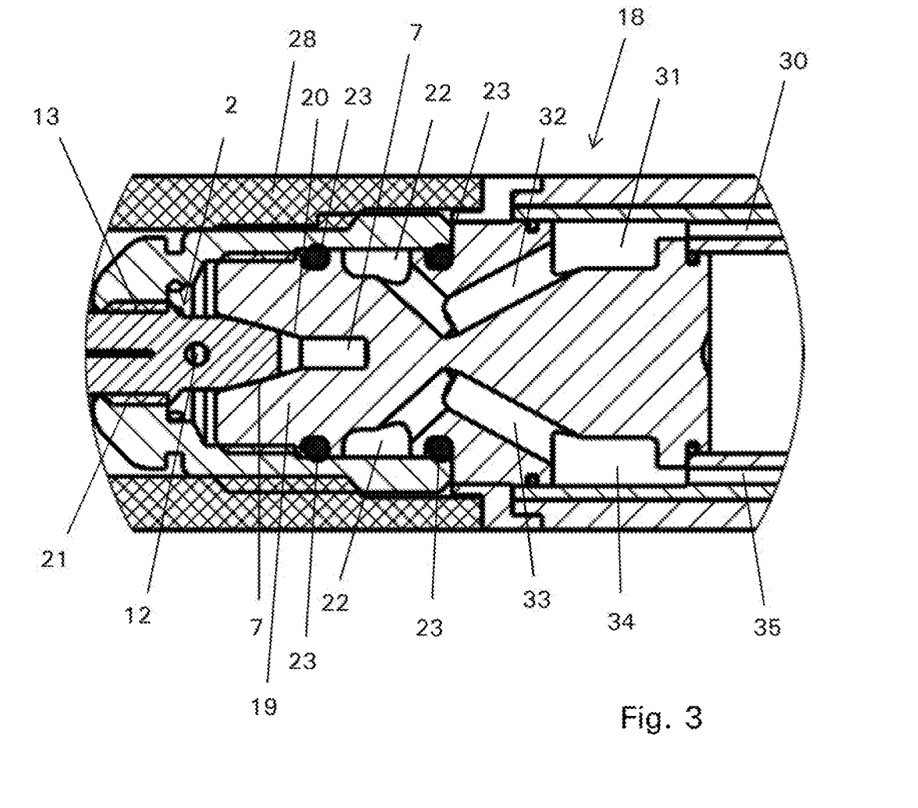
FIG. 3 a longitudinal sectional representation, taken along a higher sectional plane compared to the sectional plane of the representation in FIG. 2, of a segment of the welding torch according to the invention as represented in FIG. 2, provided with the electrode unit according to the invention according to FIG. 1.

In FIG. 2, one also can see additional structures which are used for cooling the electrode accommodation 19. This pertains to an annular channel 22 which is sealed with O-rings 23 and into which a cooling fluid is led. This guiding of the cooling fluid is represented and can be seen again more precisely in FIG. 3 and it is correspondingly explained below in reference to the description of this FIG. 3.

In FIG. 2, one can moreover see that a gas guide casing 28 is screwed on, which surrounds the gas distributor 27 and the electrode unit 1. At a front end, an opening 25 is formed between the gas guide casing 28 and the electrode 3 of the electrode unit 1 which surrounds the electrode 3 in an annular manner. By means of its electrode tip 17, the electrode 3 protrudes beyond this opening 25. As already mentioned, during the operation of the welding torch 18, gas, in particular inert gas, is then led via the gas channel 24 in the direction of the electrode unit 1. This gas is supplied to the welding torch 18 in a manner which in itself is known via a media supply line, for example, as a component of a hose package. The gas which is thus supplied via the gas channel 24 enters rearward through the inlet opening 10 into the longitudinal channel section 8 of the gas guide channel in the electrode holder 2 and flows further ahead in the direction of the rearward end of the electrode 3. Through the transverse channel sections 11, the gas then continues to flow in the direction of the outlet openings 12 and enters the gas distributor 27 there. Since, in total, four transverse channels 11 are arranged in an even angular distribution, the gas flowing through the outlet openings 12 is already distributed in a manner that is already evenly distributed radially. An additional distribution of the gas then occurs in the gas distributor 27. The outflowing gas then exits said gas distributor in a manner which in itself is known through radial outflow openings 29 and from there it continues to flow in the direction of the opening 25. Here, the gas is led by the gas guide casing 28, more precisely its inner surface, on the one hand, and, on the other hand, in the direction of the front end 6 of the electrode holder 2 by the gas guide surface 16 formed in the operative section 5. From the opening 25, the gas then exits evenly distributed in an annular manner and thus forms a protective curtain which completely surrounds the electrode tip 17 of the electrode 3. The special feature of the described gas guide then also consists in that the supplied gas, in particular the inert gas such as, for example, argon or helium, which flows through the electrode holder 2 in its interior along the gas guide channel and in the process advances into the region of the rear end of the electrode 3, during this passage through the electrode holder 2 already can absorb and dissipate heat arising there due to the welding process. In this manner, the gas, in particular inert gas, is also used, and this with high efficiency, for cooling the electrode holder 2 and thus the electrode unit 1. Since typically not all the heat generated in the welding process and transferred to the electrode unit 1 can be dissipated by the gas stream of the supplied gas, a liquid cooling is provided in addition, which cools the electrode accommodation 19 in a region which is brought as close as possible to the electrode unit 1 or to the conical accommodation 20. For this purpose, a cooling fluid is brought near and run through the annular channel 22. This occurs, as represented in greater detail in FIG. 3, in that, in the welding torch 18, via a first cooling liquid channel 30, cooling liquid, for example, cooling water, is supplied, cooling liquid which then is supplied to the annular channel 22 starting from an intermediate distributor 31 and a fluid channel formed in the electrode accommodation 19 by two bores led at a slant and meeting one another; this cooling liquid then flows again out of the annular channel via an additional fluid channel 33 through an intermediate collector 34 and an additional cooling liquid channel 35 to a cooling liquid drain.

Based on the above description of non-limiting embodiments that are only exemplary, the advantage brought along by the design according to the invention of an electrode unit 1 and also by the design according to the invention of a welding torch 18 has again become clear. The essential advantages consist, on the one hand, of the construction design of the electrode unit 1 in cooperation with the construction of the parts accommodating said electrode unit in the welding torch 18, that is to say of the electrode accommodation 19 and of the gas distributor 27 provided with the inner threading 21, here in particular the cooperation of the seating cone 7 on the electrode unit 1 with the conical accommodation 20, as well as the prevention of abutment surfaces that extend substantially perpendicularly to the longitudinal direction of the electrode unit 1 and abut against one another, whereby a jamming or wedging of the electrode unit 1 in the elements of the welding torch 18 accommodating said electrode unit is prevented. Thereby, when the electrode tip 17 of the electrode unit 1 is worn, a separation of the worn electrode unit 1 from the welding torch 18 is possible without problem, and said electrode unit can be replaced rapidly and without substantial effort by a fresh electrode unit 1 with a sharp electrode tip 17. At the same time, the cooperation of the conical accommodation 20 with the seating cone 7, due to a production accuracy to be accordingly respected, forms an abutment defined in space, in such a manner that, for each electrode unit 1 of identical design that is used, the position of the electrode tip 17 of the electrode 3 relative to the other components of the welding torch 18, for example, relative to the gas distributor 27 or also to the opening 25 of the gas guide casing 28, is identical, and thus, after a replacement of the electrode unit 1, an elaborate additional adjustment of the position of the electrode tip or even a relearning by a welding robot operating the welding torch 18 is not necessary. Moreover, an essential advantage according to the invention is the guiding of the supplied gas, in particular inert gas, through the gas guide channel formed in the interior of the electrode holder 2 (formed by longitudinal channel section 8 and the transverse channel sections 11), by means of which, using the supplied gas led through the gas guide channel, a considerable cooling effect can be obtained, that is to say a considerable portion of the heat transferred due to the welding process into the electrode 3 and thus also the electrode holder 2 can already be dissipated. The liquid cooling which, in the construction in accordance with the embodiment example, is brought effectively close to the conical accommodation 20 and thus to the rear end 9 of the inserted electrode unit 1, and which flows through the annular channel 22, brings about additional efficient cooling, so that the temperature which the electrode unit 1 experiences during the welding process can be limited to an acceptable value by efficient cooling.

In the following claims, the invention is defined and characterized in its general form.

LIST OF REFERENCE NUMERALS

1 Electrode unit
2 Electrode holder
3 Electrode
4 Shaft section
5 Operative section
6 Front end
7 Seating cone
8 Longitudinal channel section
9 Rear end
10 Inlet opening
11 Transverse channel section
12 Outlet opening
13 Outer threading
14 Tool engagement
15 Ledge
16 Gas guide surface
17 Electrode tip
18 Welding torch
19 Electrode accommodation
20 Conical accommodation
21 Inner threading
22 Annular channel
23 O-ring
24 Gas channel
25 Opening
26 Front surface
27 Gas distributor
28 Gas guide casing
29 Outflow opening
30 Cooling liquid channel
31 Intermediate distributor
32 Fluid channel
33 Fluid channel
34 Intermediate collector
35 Cooling liquid channel

The invention claimed is:

1. An electrode unit for inert gas welding by means of a non-consumable electrode comprising:
   an electrode holder; and
   an electrode which is held in the electrode holder, wherein an electrode tip is provided at a front end of the electrode, wherein said electrode protrudes beyond the electrode holder by means of the front end including the electrode tip on a first longitudinal end of the electrode holder;
   a gas guide channel formed in the electrode holder, said gas guide channel having an inlet opening located toward a second longitudinal end of the electrode holder wherein the second longitudinal end is opposite the first longitudinal end, and wherein the gas guide channel further includes at least one outlet opening which is oriented transversely with respect to a longitudinal extent of the electrode holder and is located offset from the inlet opening when viewed in direction of the longitudinal extent, toward the first longitudinal end; and
   wherein the electrode holder includes a shaft section and an operative section adjoining the shaft section in the direction of the first longitudinal end, wherein, in an area in which the operative section adjoins the shaft section, the operative section has an increased diameter in comparison to the shaft section.

2. The electrode unit according to claim 1, wherein the at least one outlet opening comprises a plurality of outlet openings arranged and distributed along a periphery of the electrode holder and oriented transversely with respect to the longitudinal extent.

3. The electrode unit according to claim 1, wherein the inlet opening is arranged on a front side of the electrode holder, which is formed on the second longitudinal end, and wherein the gas guide channel includes a longitudinal channel section which extends along the longitudinal extent starting from the inlet opening and which is led in the direction of the first longitudinal end, and further includes at least one transverse channel section which is led transversely with respect to the longitudinal channel section and opens in the at least one outlet opening.

4. The electrode unit according to claim 3, wherein the longitudinal channel section extends along a central longitudinal axis of the electrode holder.

5. The electrode unit according to claim 1, wherein the electrode ends with a rear end anchored in the electrode holder in a longitudinal position of the electrode holder, which, when viewed in the direction of the second longitudinal end of the electrode holder, lies in front of the at least one outlet opening.

6. The electrode unit according to claim 1, wherein the at least one outlet opening is formed in the shaft section.

7. The electrode unit according to claim 1, wherein the shaft section comprises a linking structure for detachable fastening of the electrode unit on a connection structure provided in a welding torch and in that, in the operative section, a tool engagement is formed, for the setting of a tool for fastening the electrode unit on the connection structure.

8. The electrode unit according to claim 1, wherein in the operative section, a peripheral side outer surface of the electrode holder with a diameter which tapers in the direction of the first longitudinal end is formed as gas guide surface.

9. The electrode unit according to claim 1, wherein in an area of the electrode's second longitudinal end, the electrode holder includes a seating cone which tapers toward the second longitudinal end.

10. The electrode unit according to claim 1, wherein the electrode is fastened by being bonded and/or pressed in the electrode holder.

11. The electrode unit according to claim 1, wherein the electrode holder is comprised of a metal with high thermal conductivity.

12. The electrode unit according to claim 11, wherein the electrode holder is comprised of copper.

13. The electrode unit according to claim 6, wherein the electrode is comprised of tungsten or a tungsten alloy.

14. An electrode unit for inert gas welding by means of a non-consumable electrode comprising:
   an electrode holder; and
   an electrode which is held in the electrode holder, wherein an electrode tip is provided at a front end of the electrode, wherein said electrode protrudes beyond the electrode holder by means of the front end including the electrode tip on a first longitudinal end of the electrode holder;
   a gas guide channel formed in the electrode holder, said gas guide channel having an inlet opening located toward a second longitudinal end of the electrode holder wherein the second longitudinal end is opposite the first longitudinal end, and wherein the gas guide channel further includes at least one outlet opening which is oriented transversely with respect to a longitudinal extent of the electrode holder and is located offset from the inlet opening when viewed in direction of the longitudinal extent, toward the first longitudinal end;
   wherein in an area of the electrode's second longitudinal end, the electrode holder includes a seating cone which tapers toward the second longitudinal end; and
   wherein the inlet opening is arranged in the area of the seating cone and the at least one outlet opening is arranged outside of the seating cone.

15. The electrode unit according to claim 14, wherein the at least one outlet opening comprises a plurality of outlet openings arranged and distributed along a periphery of the electrode holder and oriented transversely with respect to the longitudinal extent.

16. The electrode unit according to claim 14, wherein the inlet opening is arranged on a front side of the electrode holder, which is formed on the second longitudinal end, and wherein the gas guide channel includes a longitudinal channel section which extends along the longitudinal extent starting from the inlet opening and which is led in the direction of the first longitudinal end, and further includes at least one transverse channel section which is led transversely with respect to the longitudinal channel section and opens in the at least one outlet opening.

17. The electrode unit according to claim 16, wherein the longitudinal channel section extends along a central longitudinal axis of the electrode holder.

18. The electrode unit according to claim 14, wherein the electrode ends with a rear end anchored in the electrode holder in a longitudinal position of the electrode holder, which, when viewed in the direction of the second longitudinal end of the electrode holder, lies in front of the at least one outlet opening.

19. The electrode unit according to claim 14, wherein the electrode is fastened by bonding and/or being pressed in the electrode holder.

20. The electrode unit according to claim 14, wherein the electrode holder is comprised of a metal with high thermal conductivity.

21. The electrode unit according to claim 14, wherein the electrode is comprised of tungsten or a tungsten alloy.

22. The electrode unit according to claim 21, wherein the electrode holder is comprised of copper.

23. A welding torch for inert gas welding by means of a non-consumable electrode including an electrode unit comprising:
   an electrode holder; and
   an electrode which is held in the electrode holder, wherein an electrode tip is provided at a front end of the electrode, wherein said electrode protrudes beyond the electrode holder by means of the front end including the electrode tip on a first longitudinal end of the electrode holder;
   a gas guide channel formed in the electrode holder, said gas guide channel having an inlet opening located toward a second longitudinal end of the electrode holder wherein the second longitudinal end is opposite the first longitudinal end, and wherein the gas guide channel further includes at least one outlet opening which is oriented transversely with respect to a longitudinal extent of the electrode holder and is located offset from the inlet opening when viewed in direction of the longitudinal extent, toward the first longitudinal end; and
   wherein the electrode holder includes a shaft section and an operative section adjoining the shaft section in the direction of the first longitudinal end, wherein, in an area in which the operative section adjoins the shaft section, the operative section has an increased diameter in comparison to the shaft section.

24. A welding torch for inert gas welding by means of a non-consumable electrode including an electrode unit comprising:
   an electrode holder; and
   an electrode which is held in the electrode holder, wherein an electrode tip is provided at a front end of the electrode, wherein said electrode protrudes beyond the electrode holder by means of the front end including the electrode tip on a first longitudinal end of the electrode holder;
   a gas guide channel formed in the electrode holder, said gas guide channel having an inlet opening located toward a second longitudinal end of the electrode holder wherein the second longitudinal end is opposite the first longitudinal end, and wherein the gas guide channel further includes at least one outlet opening which is oriented transversely with respect to a longitudinal extent of the electrode holder and is located offset from the inlet opening when viewed in direction of the longitudinal extent, toward the first longitudinal end;
wherein in an area of the electrode's second longitudinal end, the electrode holder includes a seating cone which tapers toward the second longitudinal end; and
wherein the inlet opening is arranged in the area of the seating cone and the at least one outlet opening is arranged outside of the seating cone.

* * * * *